United States Patent
Chapin et al.

(10) Patent No.: US 6,621,940 B2
(45) Date of Patent: *Sep. 16, 2003

(54) IMAGE ROTATION IN OPPONENT COLOR SPACE

(75) Inventors: Robert M. Chapin, Rushville, NY (US); Anthony M. Frumusa, Webster, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,297

(22) Filed: Jun. 10, 1999

(65) Prior Publication Data

US 2003/0039406 A1 Feb. 27, 2003

(51) Int. Cl.[7] .................................................. G06K 9/32
(52) U.S. Cl. ........................ 382/297; 382/162; 345/658
(58) Field of Search ................................ 382/296, 297, 382/293, 162; 358/518, 523; 345/591, 600, 619, 649, 658

(56) References Cited

U.S. PATENT DOCUMENTS

| | | | | |
|---|---|---|---|---|
| 4,637,057 A | * | 1/1987 | Kermisch | 382/296 |
| 5,050,225 A | * | 9/1991 | Itoh | 382/296 |
| 5,373,311 A | * | 12/1994 | Strait et al. | 345/200 |
| 5,568,600 A | * | 10/1996 | Kaba | 345/648 |
| 5,751,865 A | * | 5/1998 | Micco et al. | 382/296 |
| 5,956,049 A | * | 9/1999 | Cheng | 345/517 |
| 5,991,403 A | * | 11/1999 | Aucsmith et al. | 380/10 |
| 6,175,653 B1 | * | 1/2001 | De Queiroz | 382/233 |
| 6,208,429 B1 | * | 3/2001 | Anderson | 358/1.18 |
| 6,339,424 B1 | * | 1/2002 | Ishikawa et al. | 345/419 |
| 6,381,371 B1 | * | 4/2002 | Epstein et al. | 382/246 |

* cited by examiner

*Primary Examiner*—Amelia M. Au
*Assistant Examiner*—Colin LaRose
(74) *Attorney, Agent, or Firm*—Oliff & Berridge, PLC

(57) ABSTRACT

An image is rotated in opponent color space, such as L*a*b* or Y $C_B$ $C_R$ color space, by inputting the opponent color space image data, subsampling the opponent color space image data, and addressing the subsampled opponent color space image data into an output configuration corresponding to a specified rotation angle. For 90° and 270° rotation, the opponent color space image data is scaled before being addressed. This eliminates distortion of the rotated image, while allowing real-time rotation of the image in hardware.

4 Claims, 5 Drawing Sheets

IMAGE ROTATION IN OPPONENT COLOR SPACE

BACKGROUND OF THE INVENTION

1. Field of Invention

This invention relates to rotating image data in an opponent color space.

2. Description of Related Art

In color image processing machines, such as digital copiers, scanners and the like, it is often desirable to provide an image rotation function to rotate a scanned image to various orientations, such as a 90°-, 180°-, and 270°-rotated position with respect to an orientation of the original image. Typically, such image rotation is performed in the red-green-blue (RGB) color space or the cyan-yellow-magenta-black (CYMK) color space, and is performed in software.

SUMMARY OF THE INVENTION

Rotating RGB or CYMK data entails rotating separate planes of color space. This is relatively slow, and does not allow real-time rotation. It would be advantageous to rotate images in an opponent color space in dedicated hardware. "Opponent color space" refers to any color space in which a luminance or gray intensity value is specified for each pixel, and in which a chrominance or color property value is also specified for each pixel. Examples of opponent color spaces include the $Y\ C_B\ C_R$ color space, which is used, for example, in JPEG implementations, and the L*a*b* color space. In the $Y\ C_B\ C_R$ color space, the "Y" value specifies the luminance or gray intensity value, and the the "$C_B$" and "$C_R$" values specify the chrominance or color properties. In the L*a*b* color space, the "L*" value specifies the luminance, and the "a*" and "b*" values specify the chrominance.

However, in many Direct Memory Access (DMA)-based systems, writing the entire opponent color space data to a page buffer of each of the opponent color space data components requires a three-byte operation that may cross over a 32-bit word boundary. In other words, many DMA systems operate on boundaries that require a minimum of two address writes per pixel. Furthermore, since rotation requires random addressing into memory, or in other words, since contiguous input pixel data cannot be written to corresponding contiguous addresses in memory, conventional speed-enhancing procedures such as memory bursting cannot be used. Therefore, rotation requires a relatively long time.

Subsampling can be used to create pixel data that fits within the system boundaries such that a plurality of pixels may be grouped and rotated as one unit. This allows DMA controllers to operate more efficiently. However, pixel grouping distorts or elongates an image during 90° and 270° rotation. This distortion will be described in detail below.

This invention provides systems and methods for rotating opponent color space data in hardware without distortion. In one exemplary embodiment, the systems and methods according to this invention rotate opponent color space image data, and, when a specified rotation angle is non-zero and non-180°, for example, when the specified rotation angle is 90° or 270°, scale and subsample input opponent color space image data and address the scaled and subsampled data into an output configuration corresponding to the specified rotation angle.

In another exemplary embodiment, the systems and methods according to this invention rotate opponent color space image data by a specified rotation angle, and include a scaler that scales the opponent color space image data, a subsampler that subsamples the opponent color space image data, and an addresser that addresses the opponent color space image data into an output configuration corresponding to the specified rotation angle. If necessary, exemplary systems and methods of this invention may also include a resolution converter to resolution convert the rotated data, and/or a tag rotator that rotates tags that are associated with the opponent color space image data into a configuration corresponding to the output configuration of the opponent color space image data.

Rotating the image data in the opponent color space using hardware allows the rotation to be performed in real time.

These and other features and advantages of this invention are described in or are apparent from the following description of various exemplary embodiments.

BRIEF DESCRIPTION OF THE DRAWINGS

Various exemplary embodiments of this invention will be described in detail, with reference to the following figures, in which.

DETAILED DESCRIPTION OF EXEMPLARY EMBODIMENTS

This invention provides systems and methods for rotating an image in opponent color space without distortion.

Figure 1:
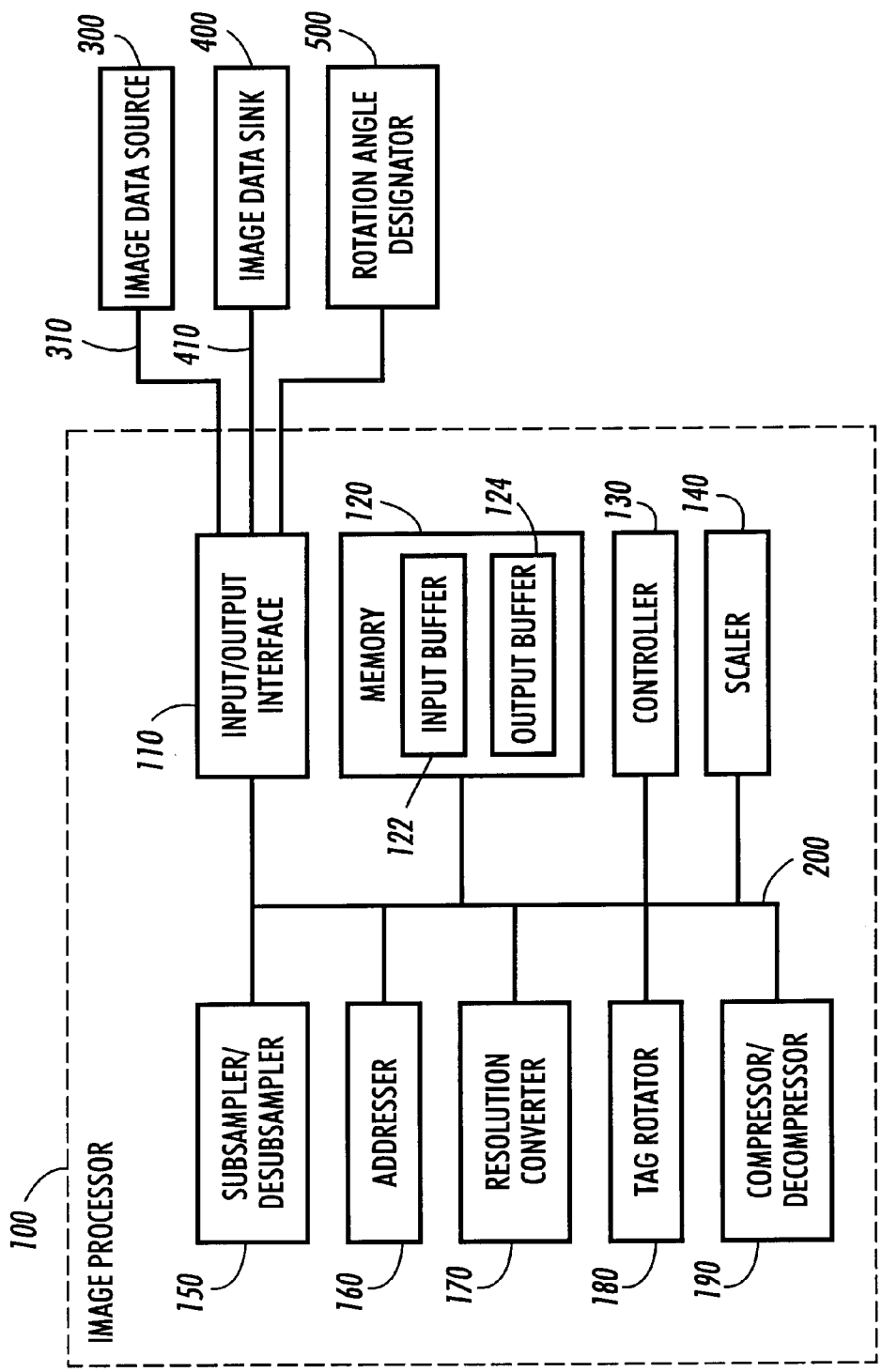
FIG. 1 is a functional block diagram of one exemplary embodiment of an image processor according to this invention.

FIG. 1 is a functional block diagram of one exemplary embodiment of an image processor 100 according to this invention. The image processor 100 includes an input/output interface 110, a memory 120, a controller 130, a scaler 140, a subsampler/desubsampler 150, an addresser 160, a resolution converter 170, a tag rotator 180 and a compressor/decompressor 190, all of which are interconnected by a data/control bus 200. The image processor 100 shown in FIG. 1 is connected to a data source 300, a data sink 400, and a rotation angle designator 500 via the interface 110.

The data source 300, the data sink 400 and the rotational angle designator 500 are depicted as being external to the image processor 100, and connected to the data/control bus 200 via the input/output interface 110. However, any or all of the data source 300, the data sink 400, and the rotation angle designator 500 may alternatively be provided as an integral part of the image processor 100, and/or connected directly to the data/control bus 200. For example, the image processor 100 may be a digital copier or the like. In this case, the data source 300 would correspond to an image pick-up unit, the data sink 400 would correspond to a printing unit, and the rotation angle designator 500 could include one or more operating buttons or the like provided on a control panel of the digital copier.

The image processor 100 shown in FIG. 1 is connected to the image data source 300 over a signal line or link 310 that provides scanned image data, and is connected to the image data sink 400 over a signal line or link 410 that receives image data output by the image processor 100. In general, the image data source 300 can be any one of a number of different sources, such as a scanner, a digital copier, or a device suitable for storing and/or transmitting electronic image data, such as a client or server of a distributed network, such as the Internet, and especially the World Wide Web. For example, the image data source 300 may be a scanner, or a data carrier such as a magnetic storage disk, CD-ROM or the like, or a host computer, that contains scanned image data.

Thus, the image data source 300 can be any known or later developed source that is capable of providing scanned image data to the image processor 100 of this invention. Similarly, the image data sink 400 can be any known or later developed device that is capable of receiving rotated image data output by the image processor 100 and either storing, transmitting, or displaying the image data. Thus, the image data sink 400 can be a printer, a facsimile machine, a digital copier, a display, a host computer, a remotely located computer, or a storage device for indefinitely storing the rotated image data until there arises a need to display or further transmit the rotated image data. The storage device can be any known structural apparatus for indefinitely storing the rotated image data, such as a RAM, a hard drive and disk, a floppy drive and disk, an optical drive and disk, a flash memory or the like.

Each of the links 310 and 410 can be any known or later developed device or system for connecting the image data source and sink 300 and 400 to the image processor 100, including a direct cable connection, a public switched telephone network, a wireless transmission channel, a connection over a wide area network or a local area network, a connection over an intranet, a connection over the Internet, or a connection over any other distributed processing network or system. In general, each of the links 310 and 410 can be any known or later developed connection system or structure usable to connect the image data source and sink 300 and 400 to the image processor 100. Further, it should be appreciated that the source 300 and/or sink 400 may be connected to the image processor 100 directly, as dedicated devices.

While FIG. 1 shows the image processor 100 as a separate device from the image data source 300 and the image data sink 400, the image processor 100 may be an integrated device, such as a digital copier, computer with a built-in printer, or any other integrated device that is capable of producing a hard copy image output. With such a configuration, for example, the image data source 300, the image processor 100, and the image data sink 400 may be contained within a single device. For example, in the case of a digital copier, the image processor 100, an image data source 300 such as a scanning device, and an image data sink 400 such as print-out device may all be provided in the same machine. As another example, in the case of a scanner, the image processor 100 and the image data source 300, for example a scanning device, may be part of the same machine, and the image data sink 400, for example a printer or a computer memory, may be physically separate.

The memory 120 is preferably implemented using static or dynamic RAM. However, the memory 120 can also be implemented using a floppy disk and disk drive, a writeable optical disk and disk drive, a hard drive, flash memory or the like. The memory 120 includes at least an input buffer 122 and an output buffer 124. The input buffer 122 receives incoming data that is to be scaled and/or rotated. The output buffer 124 receives data that has been scaled and/or rotated.

It should be appreciated that, in addition to the input buffer 122 and the output buffer 124, the memory 120 may include other memory portions, and that, provided the memory size and/or configuration allows, any or all of the incoming data may be stored in the memory 120 at any point before, during or after processing within the image processor 100. The memory 120 may also store any programs or control data used by any of the components within the image processor 100. It should further be appreciated that the memory 120 need not be a single physical entity, or provided at a single location. For example, the input buffer 122, the output buffer 124 and/or other portions of the memory 120 may be physically distinct and separate from each other.

The controller 130, the scaler 140, the subsampler/desubsampler 150, the addresser 160, the resolution converter 170, the tag rotator 180 and the compressor/decompressor 190 can be implemented as physically distinct hardware circuits within one or more ASICs, or using one or more FPGAs, PDLs, PLAs, or PALs, or using discrete logic elements or discrete circuit elements. The particular form each of the systems shown in FIG. 1 will take is a design choice and will be obvious and predictable to those skilled in the art. Alternatively, one or more of the controller 130, scaler 140, subsampler/desubsampler 150, addresser 160, resolution converter 170, tag rotator 180 and compressor/decompressor 190 may be implemented wholly or partially using software. Those skilled in the art will understand, or will be able to determine through testing, which, if any, of the systems shown in FIG. 1 may be implemented using software.

The data/control bus 200 can be a PCI bus, although those skilled in the art will understand how to implement various other bus types, such as FIREWIRE™, AGP bus and RAM bus.

In the exemplary embodiment shown in FIG. 1, opponent color space data is input from the data source 300 via the input/output interface 110. The input data is temporarily saved in the memory 120 under control of the controller 130.

The controller 130 determines whether the input data is to be rotated, and, if so, to what degree. Specifically, if rotation is to be performed, the controller 130 determines whether the data is to be rotated 90°, 180° or 270°, for example. These determinations may be made based upon input from a user that is entered via the rotation angle designator 500. A default determination, such as "no rotation" or "90° rotation", may be made by the controller 130 absent any input from the rotation angle designator 500.

When the specified angle of rotation is non-zero and non-180°, for example, when the specified rotation angle is 90° or 270°, the scaler 140 scales the data, as will be described in detail below, under control of the controller 130.

Unscaled data from the memory 120 or data to be 90°- or 270°-rotated that has been scaled by the scaler 140 is subsampled by the subsampler/desubsampler 150 under control of the controller 130. Subsampled data is then random-addressed into the memory 120, or, alternatively, output to the data sink 400 via the input/output interface 110, by the addresser 160, under control of the controller 130.

If necessary, the resolution converter 170 resolution converts the data under control of the controller 130 before and/or after the data is sent to the memory 120 or the data sink 400. For example, if the data sink 400 requires data of a different resolution than the post-rotation resolution, resolution conversion must be performed. For example, if the input image is 600 pixels per inch in the fast scan direction and 600 pixels per inch in the slow scan direction, the image will have a fast scan resolution of 1200 pixels per inch and a slow scan resolution of 300 pixels per inch if it is rotated 90° or 270° because of pixel grouping that is done to keep within word boundaries. This pixel grouping will be described in detail below. If the data sink is designed to accommodate data at 600×600 pixels per inch, a 200% interpolation or magnification must be done in the slow scan direction, and a 50% interpolation must be done in the fast scan direction. An example of such resolution conversion is set forth in co-pending application Ser. No. 09/075,851, the disclosure of which is incorporated herein by reference in its entirety.

If the image data includes tag information, such as segmentation tag information or the like, the tag rotator 180 rotates the tags under control of the controller 130 so that they will be properly associated with the rotated image data. The tag rotator 180 may rotate the tags during a separate operation, or, if sufficient memory resources are available such that a separate data channel can be provided in the image processor 100, the tag rotator 180 may operate concurrently with the scaler 140, the subsampler/desubsampler 150 and/or the addresser 160.

The compressor/decompressor 190 may, for example, be a JPEG compressor/decompressor. When incoming data to be rotated is input in a compressed stated, such as a JPEG-compressed state, the compressor/decompressor 190 decompresses the data prior to rotation. After the data is rotated, if the data is to be returned to a JPEG-compressed state, the compressor/decompressor 190 compresses the data. In this case, if necessary or desirable, the subsampler/desubsampler 150 desubsamples the data prior to compression by the compressor/decompressor 190.

It should be appreciated that the resolution converter 170, the tag rotator 180 and the compressor/decompressor 190 are used only when required. Therefore, in some embodiments of this invention, the image processor 100 need not include the resolution converter 170, the tag rotator 180 and/or the compressor/decompressor 190.

The operation of the scaler 140, the subsampler/desubsampler 150 and the addresser 160 will be described in more detail below with reference to FIGS. 2–8.

Figure 2:
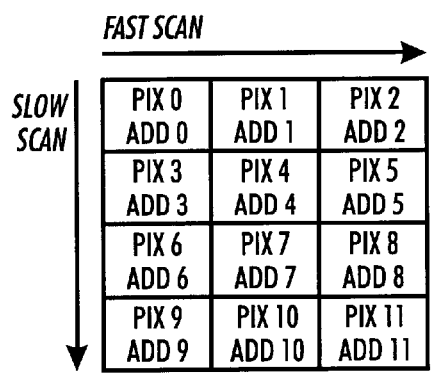
FIG. 2 shows a schematic representation of data to be rotated.

FIG. 2 shows a schematic representation of data that is to be rotated. The data in this example includes twelve pixel data, PIX 0–PIX 11. Pixel data PIX 0–PIX 11 are located in addresses ADD 0–ADD 1, respectively.

Figure 3:
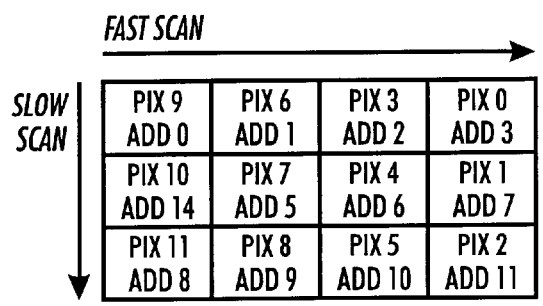
FIG. 3 shows the image data of FIG. 2 rotated 90°.

FIG. 3 shows the desired configuration of the data of FIG. 2 after it has been rotated 90°. Specifically, pixel data PIX 0–PIX 2 are moved to addresses ADD 3, ADD 7 and ADD 11, respectively. Pixel data PIX 3–PIX 5 are moved to addresses ADD 2, ADD 6, and ADD 10, respectively. Pixels PIX 6–PIX 8 are moved to addresses ADD 1, ADD 5 and ADD 9, respectively. Pixel data PIX 9–PIX 11 are moved to addresses ADD 0, ADD 4 and ADD 8, respectively.

When the above-described rotation is performed using conventional software methods, considerable time is required and the rotation cannot be performed in real time.

Figure 4:
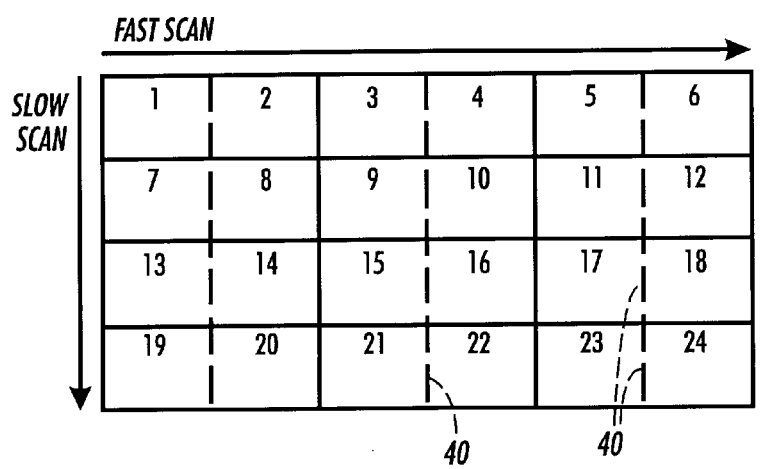
FIG. 4 shows another schematic representation of data to be rotated.

FIG. 4 shows another schematic representation of data to be rotated. In FIG. 4, dashed lines 40 represent bit boundaries for respective sets of two pixels. In other words, a dashed line 40 between two pixels signifies that these pixels are to be grouped together and rotated as one. This results in greater processing speed in performing the rotation.

Figure 5:
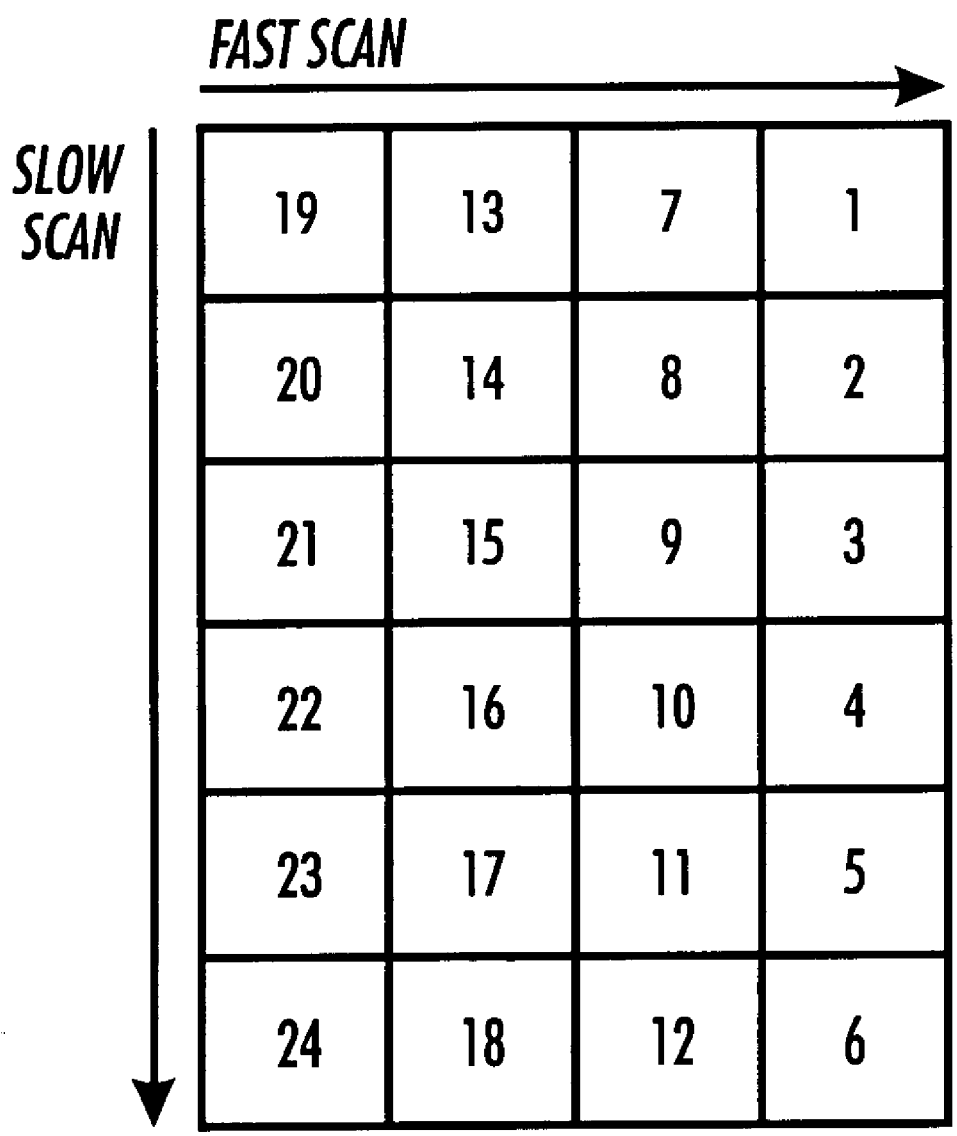
FIG. 5 shows a desired rotated output configuration of the image data of FIG. 4.

FIG. 5 shows a desired 90°-rotated output configuration of the image data of FIG. 4. This desired output rotation configuration corresponds in principle to the rotated configuration shown in FIG. 3.

Figure 6:
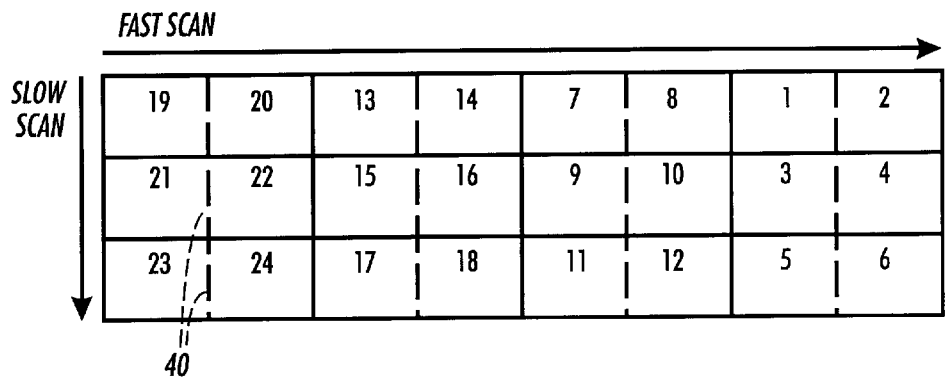
FIG. 6 is a schematic representation of image data that has been elongated by rotation.

However, since the pixel data are moved in pairs, the actual rotated output configuration would be as shown in FIG. 6. Comparing the actual rotated output configuration of FIG. 6 with the desired rotated output configuration of FIG. 5, it can be seen that the pixel data, as a whole, becomes elongated in the fast scan direction and compressed in the slow scan direction. Hence, the output image appears distorted. Specifically, the image is twice as long as it should be in the fast scan direction, and only half as long as it should be in the slow scan direction.

Figure 7:
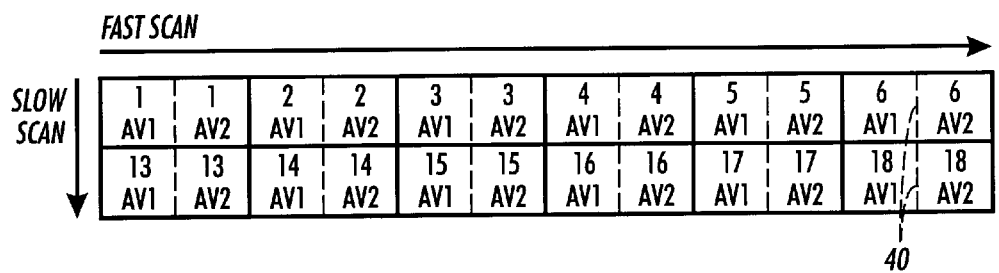
FIG. 7 is a schematic representation of image data that has been scaled and subsampled according to this invention.

In order to avoid an output configuration such as is shown in FIG. 6, the data is scaled and subsampled prior to rotation. FIG. 7 illustrates an example of this scaled and subsampled data.

FIG. 7 shows the scaled image data. In FIG. 7, the image data is elongated in the fast scan direction by "doubling" pixels 1–6 and 13–18, and "eliminating" pixels 7–12 and 19–24. Although pixels 1–6 and 13–18 are "doubled", the added pixels are not identical because their characteristics are determined by subsampling, as described below. Likewise, although pixels 7–12 and 19–24 are "eliminated", their information is not completely lost because it is partially incorporated into the remaining pixels by the subsampling.

This scaled data is subsampled as follows. Specifically, each set of AV1 and AV2 in FIG. 7 represents two pixels in a subsampled format, such as the standard subsampled format $L*1L*2a*b*$ when the opponent color space data is $L*a*b*$ data, or Y 1Y $2C_B$ $C_R$, when the opponent color space data is Y $C_B$ $C_R$ data. For $L*a*b*$ data, when the exemplary format $L*1L*2a*b*$ is used, the $L*$ component of pixel 1 AV1 can be obtained as follows:

$$L*=(L*\text{component (pixel 1)}+L*\text{component (pixel 7)})/2.$$

The $L*$ component of pixel 1 AV2 can be obtained as follows:

$$L*=((L*\text{component (pixel 1)}+L*\text{component (pixel 2)}/2)/(L*\text{component (pixel 7)}+L*\text{component (pixel 8)})/2))/2.$$

The $a*$ and $b*$ components for the pair of pixels 1 AV1 and 1 AV2 can be obatined as follows:

$$a*=(((\text{pixel } 1a*+(\text{pixel } 1a*+\text{pixel } 2a*)/2)/2)+(\text{pixel } 7a*+((\text{pixel } 7a*+\text{pixel } 8a*)/2)/2))/2.$$

$$b*=(((\text{pixel } 1b*+(\text{pixel } 1b*+\text{pixel } 2b*)/2)/2)+(\text{pixel } 7b*+((\text{pixel } 7b*+\text{pixel } 8b*)/2)/2))/2.$$

In this subsampling format, the same $a*$ and $b*$ values are used for both pixels in a pixel pair. In other words, the above formulas give the $a*$ and $b*$ values for both pixels 1 AV1 and 1 AV2.

It will be appreciated that the $L*$, $a*$ and $b*$ components of the remaining pixels are obtained in a similar manner.

Similarly, for Y $C_B$ $C_R$ data, when the exemplary format Y 1Y $2C_B$ $C_R$ is used, the Y component of pixel 1 AV1 can be obtained as follows:

$$Y=Y\text{ component (pixel 1)}+Y\text{ component (pixel 7)})/2.$$

The Y component of pixel 1 AV2 can be obtained as follows:

$$Y=((Y\text{ component (pixel 1)}+Y\text{ component (pixel 2)}/2)/(Y\text{ component (pixel 7)}+Y\text{ component (pixel 8)})/2))/2.$$

The $C_B$ and $C_R$ components for the pair of pixels 1 AV1 and 1 AV2 can be obatined as follows:

$C_B$=(((pixel 1$C_B$+(pixel 1$C_B$+pixel 2$C_B$)/2)/2)+(pixel 7$C_B$+((pixel 7$C_B$+pixel 8$C_B$)/2)/2))/2.

$C_R$=(((pixel 1$C_R$+(pixel 1$C_R$+pixel 2$C_R$)/2)/2)+(pixel 7$C_R$+((pixel 7$C_R$+pixel 8$C_R$)/2)/2))/2.

In this subsampling format, the same $C_B$ and $C_R$ values are used for both pixels in a pixel pair. In other words, the above formulas give the $C_B$ and $C_R$ values for both pixels 1 AV1 and 1 AV2.

It will be appreciated that the Y, $C_B$ and $C_R$ components of the remaining pixels are obtained in a similar manner.

The above subsampling formats are only two examples of subsampling formats that may be used according to this invention. If desired, various other subsampling formats, such as subsampling formats involving various weightings or the like, may be used.

Obviously, some error will be introduced by the above-described rotation and subsampling. When the data is subsampled according to the above-described subsampling format, a slight fuzz can be seen under a microscope on the edges of fine lines. However, this fuzz is not visible to the naked eye, so the post-rotation image quality is very acceptable for most purposes.

Figure 8:
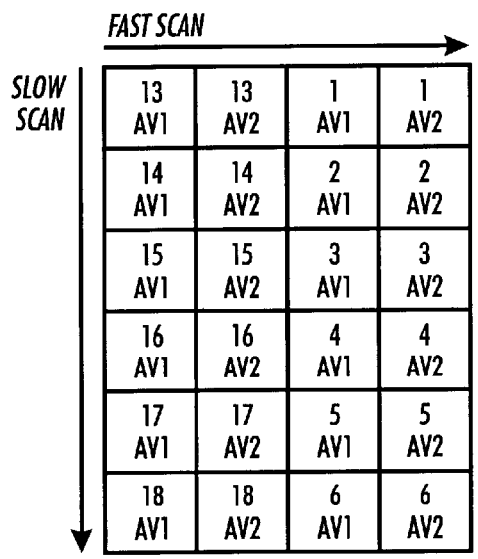
FIG. 8 is a schematic representation of image data that has been rotated according to this invention.

After the image data has been scaled and subsampled as shown in FIG. 7, and as described above, it is random-addressed into memory as shown in FIG. 8. More specifically, pixels 1 AV1 and 1 AV2 are kept together and addressed into the upper right-most position shown in FIG. 8. The pixels 2 AV1 and 2 AV2 are kept together and addressed into the position directly below 1 AV1 and 1 AV2 in FIG. 8. This process continues sequentially until the last pixel pair, 18 AV1 and 18 AV2, is addressed to the lower left-most position shown in FIG. 8. The image data is thus placed in a 90°-rotated configuration.

Although the above-described addressing is random, bandwidths of 50 megabytes per second can be achieved, which will allow real-time rotation through an input source with a scanning speed of 30–40 copies per minute at 600×600 pixel resolution.

By comparing the rotated output configuration shown in FIG. 8 to the desired rotated output configuration shown in FIG. 5, it can be seen that the rotated image is not distorted (i.e., compressed or elongated in either direction). While the above-described process specifically describes 90° rotation, it should be appreciated that 270° rotation is performed in substantially the same manner. In other words, for 270° rotation, the data is scaled and sampled as shown in FIG. 7 and as described above, and then random-addressed into a 270°-rotated configuration. Specifically, the pixel pair 1 AV1 and 1 AV2 will be addressed to the lower left-most position in an output data configuration corresponding to that shown in FIG. 8, the pixel pair 2 AV1 and 2 AV2 will be addressed to the position directly above pixels 1 AV1 and 1 AV2, and so on until the pixel pair 18 AV1 and 18 AV2 are addressed to the upper right-most position.

In addition, the principles of this invention are not limited to the specific rotation examples described above. While only the cases of 90° rotation and 270° rotation are described above, those skilled in the art will appreciate that the principles of this invention may be applied to rotation to other non-zero, non-180° angles.

In the case of 180° rotation, scaling is not required since fast scan data is not being moved into the slow scan direction. In other words, the data may be directly random-addressed into a 180°-rotated configuration. This results in error-free data. Subsampling may be performed for 180° rotation, but is not required. Those skilled in the art will understand the subsampling format for 180° rotation, if 180° rotation is to be performed.

Figure 9:
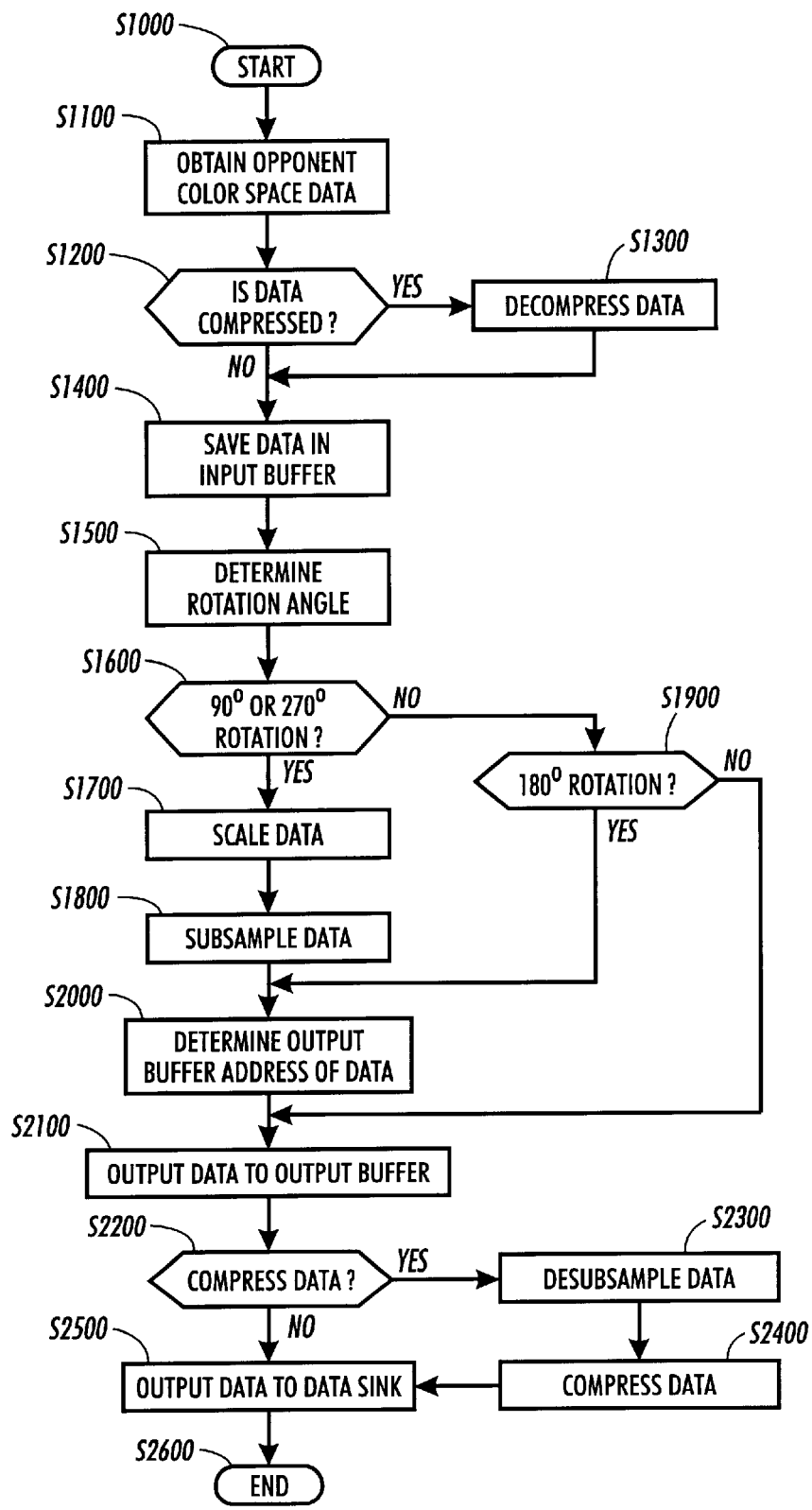
FIG. 9 is a flowchart outlining one exemplary embodiment of a method for rotating image data according to this invention.

FIG. 9 is a flowchart outlining one exemplary embodiment of a method for rotating image data according to this invention. Beginning in step S1000, control continues to step S1100, where opponent color space data is obtained from a data source. Next, in step S1200, it is determined whether the obtained data is compressed. For example, when the data is JPEG data that is obtained through a JPEG reader, it is typically in a compressed format. If it is determined that the obtained data is compressed, control continues to step S1300. Otherwise, control jumps to step S1400.

In step S1300, the data is decompressed. Next, in step S1400, the data is saved in an input buffer. Control then continues to step S1500.

In step S1500, an image rotation angle is determined. This determination may be based upon a user input, or may be a default value. Next, in step S1600, it is determined whether the rotation angle is 90° or 270°. If the rotation angle is 90° or 270°, control continues to step S1700. Otherwise, control jumps to step S1900. In step S1700, the data is scaled. Control then continues to step S1800, where the data is subsampled. Control then jumps to step S2000.

In step S1900, it is determined whether the rotation angle is 180°. If the rotation angle is 180°, control continues to step S2000. Otherwise, no rotation is to be performed, and control jumps to step S2100. In other words, when no rotation is to be performed, random addressing is not necessary, and the data may simply be directly output, and may be stored using a memory bursting technique or the like. Therefore, an address determination step such as step S2000, described below, is not necessary.

In step S2000, an output buffer address is determined for the subsampled data, based on the rotation angle determined in step S1500. Next, in step S2100, the data is output to the address of the output buffer determined in step S2000. Control then continues to step S2200, where it is determined whether the data is to be compressed. For example, it may be determined whether the data is to be compressed into a JPEG format. If the data is to be compressed, control continues to step S2300. Otherwise, control jumps to step S2500.

In step S2300, the data is desubsampled. Next, in step S2400, the data is compressed. Control then continues to step S2500.

In step S2500, the data is output to a data sink. Finally, in step S2600, the control procedure ends.

In the above-described embodiment, data that is to be rotated 180° is not subsampled. It should be appreciated that if data that is to rotated 180° is to be subsampled, the control procedure will jump from step S1900 to step S1800, rather than to step S2000 as illustrated.

While the invention has been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

What is claimed is:

1. A method of rotating component color space image data, comprising:
   inputting the opponent color space image data;
   specifying a non-zero, non-180° rotation angle;
   scaling the opponent color space image data;
   subsampling the opponent color space image data; and
   addressing the subsampled opponent color space image data into an output configuration corresponding to the specified rotation angle,
wherein specifying a non-zero, non-180° rotation angle comprises specifying one of a 90° rotation angle and a 270° rotation angle.

2. A method of rotating opponent color space image data, comprising:
    inputting the opponent color space image data;
    specifying a non-zero, non-180° rotation angle;
    scaling the opponent color space image data;
    subsampling the opponent color space image data; and
    addressing the subsampled opponent color space image data into an output configuration corresponding to the specified rotation angle,
    wherein scaling the opponent color space image data comprises elongating the opponent color space image data in a fast scan direction and compressing the opponent color space image data in a slow scan direction.

3. A system that rotates opponent color space image data by a specified rotation angle, comprising:
    a scaler that scales the opponent color space image data;
    a controller that specifies a non-zero, non-180° rotation angle comprising one of a 90° rotation angle and a 270° rotation angle;
    a subsampler that subsamples the opponent color space image data; and
    an addresser that addresses the opponent color pace image data into an output configuration corresponding to the specified rotation angle.

4. A system that rotates opponent color space image data by a specified rotation angle, comprising:
    a scaler that scales the opponent color space image data;
    a controller that specifies a non-zero, non-180° rotation angle;
    a subsampler that subsamples the opponent color space image data;
    an addresser that addresses the opponent color space image data into an output configuration corresponding to the specified rotation angle; an
    wherein the opponent color space image data is scaled by elongation in a fast scan direction and by compression in a slow scan direction.

* * * * *